United States Patent [19]

Ladin

[11] 4,276,974
[45] Jul. 7, 1981

[54] SELF-ALIGNING CLUTCH RELEASE BEARING

[75] Inventor: Eli M. Ladin, Ann Arbor, Mich.

[73] Assignee: Federal-Mogul Corp., Detroit, Mich.

[21] Appl. No.: 9,247

[22] Filed: Feb. 5, 1979

Related U.S. Application Data

[63] Continuation-in-part of Ser. No. 890,473, Mar. 27, 1978, abandoned.

[51] Int. Cl.$^3$ .............................................. F16D 23/14
[52] U.S. Cl. .................................. 192/98; 192/110 B; 308/233
[58] Field of Search ............... 192/98, 110 B; 308/233

[56] References Cited

U.S. PATENT DOCUMENTS

| 1,606,127 | 11/1926 | Kolb | 192/98 |
|---|---|---|---|
| 2,995,406 | 8/1961 | Pitner | 192/98 |
| 3,333,665 | 8/1967 | Einchcomb et al. | 192/98 X |
| 3,416,637 | 12/1968 | Maurice | 192/98 |
| 3,788,437 | 1/1974 | Camp | 192/98 |
| 3,815,715 | 6/1974 | Maucher | 192/98 |
| 3,877,557 | 4/1975 | Maucher | 192/98 |
| 3,882,979 | 5/1975 | Limbacher et al. | 192/98 |
| 3,900,091 | 8/1975 | Maucher | 192/98 |
| 3,904,008 | 9/1975 | Sonnerat | 192/98 |
| 3,931,875 | 1/1976 | Ladin | 192/98 |
| 3,948,371 | 4/1976 | Lonne | 192/98 |
| 3,951,244 | 4/1976 | Neder | 192/98 |
| 4,029,186 | 6/1977 | De Gennes | 192/98 |
| 4,077,504 | 3/1978 | Ernst et al. | 192/98 |
| 4,080,019 | 3/1978 | Flaissier et al. | 192/98 X |
| 4,093,053 | 6/1978 | Ernst et al. | 192/98 |
| 4,117,917 | 10/1978 | Ladin et al. | 192/98 |
| 4,125,181 | 11/1978 | Stenzinger | 192/110 B X |
| 4,142,618 | 3/1979 | Fontaine et al. | 192/98 |
| 4,143,748 | 3/1979 | Maucher | 192/98 |

FOREIGN PATENT DOCUMENTS 2413856 10/1974 Fed. Rep. of Germany.
2457352 6/1976 Fed. Rep. of Germany.
2533560 2/1977 Fed. Rep. of Germany.

Primary Examiner—Rodney H. Bonck
Attorney, Agent, or Firm—Harness, Dickey & Pierce

[57] ABSTRACT

A self-aligning clutch release bearing assembly including a tubular bearing carrier and a anti-friction bearing assembly encircling the bearing carrier and supported thereon by means of an annular spring washer which enables relative restricted shifting movement of the axis of the bearing relative to the axis of the bearing carrier to compensate for eccentricity in the axis of rotation of a clutch assembly and a guide member on which the clutch release bearing assembly is mounted. In addition, the spring washer permits restricted angular displacement of the axis of the bearing assembly relative to the axis of the bearing carrier to compensate for angular misalignment between the clutch assembly and axis of reciprocation of the clutch release bearing assembly. The bearing carrier further includes coacting means for engaging a clutch actuating device such as a actuating fork for preventing relative rotation of the clutch release bearing assembly whereby an adjustment for radial misalignment by the bearing assembly is appropriately maintained during subsequent clutch actuation cycles.

48 Claims, 10 Drawing Figures

SELF-ALIGNING CLUTCH RELEASE BEARING

CROSS-REFERENCES TO RELATED APPLICATIONS

The present application is a continuation-in-part of prior copending application, Ser. No. 890,473, filed Mar. 27, 1978, and now abandoned.

BACKGROUND OF THE INVENTION

Various types of clutch release or throw-out bearing assemblies have heretofore been used or proposed for use in the drive train of automobiles and the like equipped with manual transmissions. The relatively severe operating conditions to which clutch release bearing assemblies are subjected during service has prompted continuing development of improved designs for providing positive and quiet operation over an increased operating life. The relative severity of the operating conditions to which clutch throw-out bearings are subjected are in at least part attributable to the intermittent loading to which they are subjected, the relatively abrupt imposition of loading and rotational forces during the actuation and release of a clutch assembly, the marginal lubricating conditions to which they are subjected during operation, the effect of vibration on the wear of the operating components as well as a misalignment of the axis of the clutch release bearing and the axis of rotation of the rotating clutch assembly imposing a non-uniform distribution of loading on the assembly.

The continuing development work has resulted in substantial improvements in the operating efficiency, durability and life of clutch release assemblies some of which further include devices for providing self-adjustment for misalignment between the axis of the release assembly and the axis of rotation of the clutch and release members thereon. In some of the prior art designs, the self-adjusting alignment action occurs each time the clutch mechanism is actuated with the release bearing assembly returning to a neutral position after the clutch is reengaged. This repeated self-adjusting action and the relative movement between the components to compensate for a misaligned condition has resulted in increased wear and a corresponding reduction in the useful operating life of the release bearing assembly. In other prior art constructions, at least a portion of the self-adjusting action is retained overcoming certain of the deficiencies of other prior art self-aligning clutch release assemblies. Unfortunately, clutch release assemblies incorporating self-aligning features in accordance with prior art practices are relatively complex rendering them somewhat costly to manufacture and assemble. Typical of such prior art constructions are those as disclosed in U.S. Pat. Nos. 3,416,637; 3,815,715; 3,877,557; 3,900,091; and 4,029,186.

It is, accordingly, a principal object of the present invention to provide for an improved self-aligning clutch release bearing assembly which overcomes many of the problems and disadvantages associated with prior art constructions and which is of simple design, durable operation, which possesses self-aligning capability, and which is of economical manufacture.

SUMMARY OF THE INVENTION

The benefits and advantages of the present invention are achieved by a self-aligning clutch release bearing assembly of a type adapted to be reciprocally mounted on a guide member such as a transmission support tube disposed substantially coaxial with the axis of rotation of a clutch and clutch actuating means of the type employed in automotive power trains or the like. The clutch release assembly is reciprocable along the guide member by suitable actuating means such as an actuating fork connected to the clutch pedal of a vehicle equipped with a manually shiftable transmission. The clutch release bearing assembly includes a tubular bearing carrier slidably mounted on the guide member and a bearing supported on the bearing carrier including a plurality of anti-friction elements interposed between a stationary race member and a rotatable race member. The rotatable race member is provided with an engaging face adapted to engage the clutch release means during a clutch operating cycle.

The stationary race member, in accordance with one embodiment of the present invention, is formed with a bore defining an internal surface disposed in spaced relationship around the periphery of the bearing carrier and includes an inwardly extending groove in which the peripheral portion of a spring washer is disposed permitting restricted relative shifting movement between the axis of the bearing carrier and the bearing in response to an eccentric misalignment condition between the axis of the guide member and the rotational axis of the clutch. Additionally, the spring washer is resiliently displaceable in an axial direction to enable restricted angular displacement of the axis of the bearing relative to the axis of the bearing carrier to compensate for an angular misalignment condition between the axis of the guide member and the rotational axis of the clutch. The inner portion of the spring washer is suitably restrained against relative longitudinal movement on the bearing carrier such as by means of an inwardly extending groove around the periphery of the bearing carrier.

The bearing carrier is further provided, in accordance with a preferred embodiment of the present invention, with a radially projecting flange at its rearward end which is formed with a radially extending notch for engaging the clutch actuating means or fork whereby relative rotation of the clutch release assembly after the first clutch operating cycle is prevented whereby the radial adjustment of the bearing to correct an eccentric misalignment condition is retained during subsequent clutch operating cycles. The bearing carrier preferably is formed of a rolled tubular sheet and the flange is integrally formed at one end such as by upsetting. The internal surface of the bearing carrier preferably is provided with one or more recesses adapted to receive and retain a reservoir of a lubricant to facilitate reciprocating movement of the clutch release assembly along the guide member.

In accordance with an alternative embodiment of the present invention, the inner race member rotates and the outer race member is stationary. According to one form of this embodiment, the periphery of the external surface of the outer stationary race member is formed with an inwardly extending groove in which the inner portion of the spring washer is disposed permitting restricted relative shifting movements of the bearing assembly with respect to the bearing carrier to compensate for a misalignment condition. The bearing carrier is provided with an annular housing encircling the periphery of the stationary race member and disposed in spaced clearance relationship thereto for receiving and engageably supporting the periphery of the spring washer.

DESCRIPTION OF THE PREFERRED EMBODIMENTS

Figure 1:
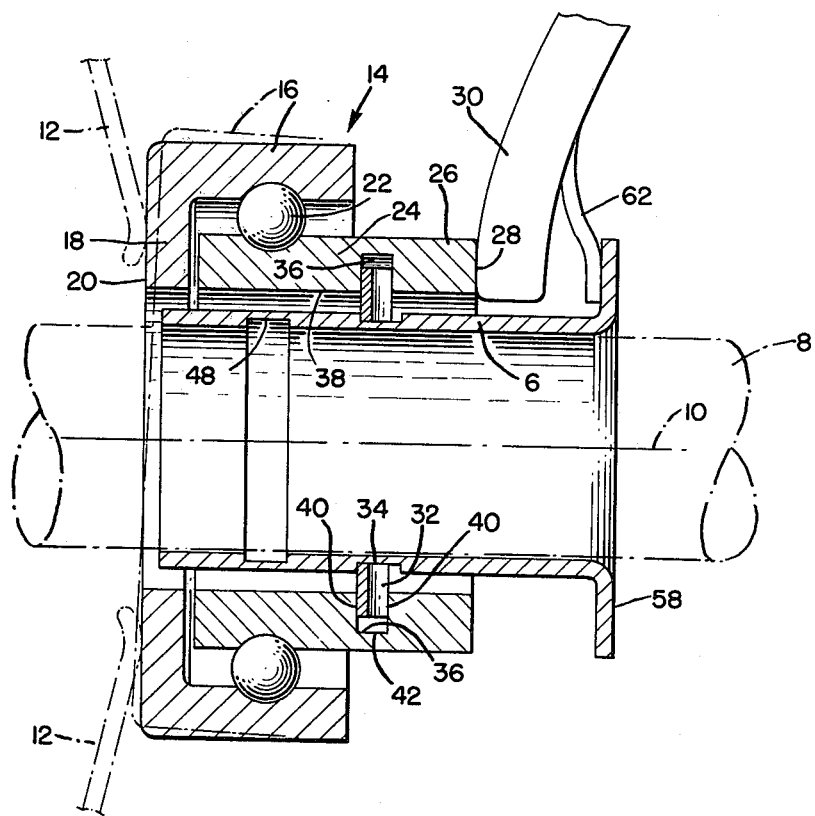
FIG. 1 is a longitudinal vertical sectional view of a self-aligning clutch release bearing assembly constructed in accordance with one of the embodiments of the present invention and showing an actuating fork fragmentarily.

Referring now in detail to the drawings and as may be best seen in FIG. 1, a clutch release bearing assembly constructed in accordance with one of the embodiments of the present invention is shown and comprises a tubular bearing carrier 6 adapted to be slidably mounted on a guide member 8 as shown in phantom which may typically comprise a tubular support affixed to and projecting forwardly of a transmission (not shown) through which the transmission shaft extends. The guide member is disposed with its axis 10 substantially coaxial with the axis of rotation of a rotatable clutch (not shown) including clutch release means such as release fingers 12 as shown in phantom in FIG. 1. The self-aligning characteristics of the clutch release bearing assembly subsequently to be described are intended to compensate for unavoidable misalignment conditions resulting from manufacturing tolerances and assembly techniques wherein the axis 10 is parallel to but eccentric or offset from the axis of rotation of the rotary clutch and release fingers 12 providing for an eccentric misalignment condition as well as where the axis 10 is angularly inclined relative to the axis of rotation of the rotary clutch and release fingers 12 causing an angular misalignment condition.

Referring again to FIG. 1, an anti-friction bearing assembly 14 is supported in encircling radially spaced relationship around the tubular bearing carrier 6 and includes a rotatable race member 16 which is formed at its forward end or left hand end as viewed in FIG. 1 with a radially inwardly extending flange 18, the annular exterior face 20 of which defines an engaging face for coacting with the ends of the clutch release fingers 12 during actuation of the clutch mechanism. The bearing assembly 14 further includes a plurality of anti-friction elements such as balls 22 interposed between the rotatable race member 16 and an inner stationary race member 24. Preferably the bearing assembly 14 is of the angular contact type to withstand the thrust loads imposed thereon.

Figure 4:
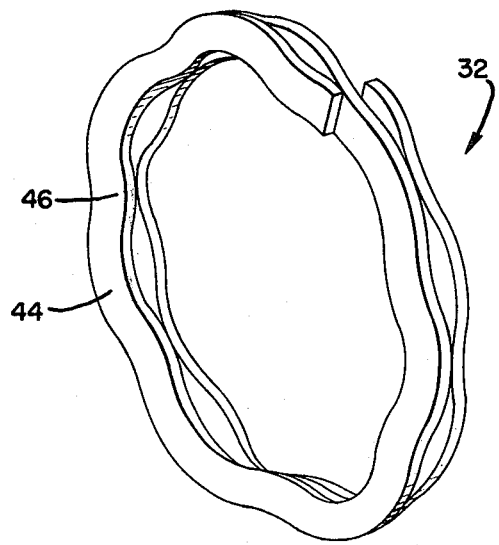
FIG. 4 is a perspective view of a spring washer employed in the clutch release bearing assemblies of FIGS. 1 and 2.

The stationary race member 24 is provided with an axial rearward extension 26 terminating in a substantially radial annular face 28 which is adapted to be disposed in bearing contact with the end of clutch actuating means such as an actuating fork 30 as fragmentarily shown in FIG. 1. The bearing assembly 14 is supported or suspended in radially spaced substantially concentric relationship with respect to the periphery of the bearing carrier 6 by means of a spring washer 32 as best seen in FIG. 4 which is seated along its inner edge portion in a groove 34 extending around the periphery of the bearing carrier preventing relative axial movement between the bearing carrier and spring washer. The groove 34 is of a width slightly greater than the thickness of the spring washer to facilitate assembly. The inner diameter of the spring washer in a free, unstressed condition as shown in FIG. 4 is slightly smaller than the diameter of the base of the groove 34 whereby the spring washer is in a circumferentially biased condition when seated in the groove 34 with the inner edges thereof in gripping engagement around the bearing carrier restricting relative movement therebetween.

The outer peripheral portion of the spring washer 32 is disposed in axially biased interlocking relationship within an annular groove 36 extending radially inwardly of the surface of a circular bore 38 through the stationary race member 24. The annular groove 36 is defined by a pair of axially spaced substantially parallel and radially extending sidewalls 40 terminating at an end wall 42 defining the depth of the groove. As will be noted in FIG. 1, the outer diameter of the spring washer 32 is slightly smaller than the diameter of the end wall 42 of the annular groove 36 providing for radial clearance therebetween for the purposes subsequently to be described.

Referring now in detail to FIG. 4, the spring washer 32 in accordance with a preferred embodiment of the present invention comprises a spirally or helically wound strip of substantially constant diameter of a resilient material such as spring steel to form a plurality of overlying layers. As shown, the helically wound strip is of a generally flat rectangular cross-sectional configuration and is deformed so as to incorporate a serpentine configuration comprising a repetitive series of axially projecting crests 44 and troughs 46. When the spring washer comprises a plurality of overlying layers in accordance with the arrangement illustrated in FIG. 4, the circumferential disposition of the crests and troughs are offset from one layer to the next layer to provide for axial resilient compaction to a resilient preloaded condition when disposed in interlocked relationship within the annular groove 36 of the stationary race member (FIG. 1). The spring washer 32 of FIG. 4 is further characterized as being resiliently deformable from its unloaded condition as shown in FIG. 4 to reduce its external diameter and to increase its internal diameter in response to relative sliding movement of the serpentine layers over each other as required during installation and assembly of the release bearings.

In accordance with the specific arrangement illustrated in FIG. 1, the spring washer 32 is first installed in the annular groove 36 of the stationary race member by radially deflecting the spring washer inwardly to reduce its external diameter to enable insertion thereof into the bore through the stationary race member. The spring washer thereafter is moved along the interior bore until it radially expands and snaps into the annular groove 36. The width of the annular groove is less than the axial width of the spring washer so as to provide some axial preloading of the spring washer during initial assembly. Thereafter the spring washer is radially expanded provided by the clearance between its periphery and the end wall 42 of the groove enabling the unflanged end of the tubular bearing carrier to be inserted therethrough and advanced until the spring washer snaps into interlocking relationship in the peripheral groove 34 around the bearing carrier. By an appropriate disposition of the crests and troughs in the serpentine strip defining the spring washer, a relative camming coaction therebetween is effected during the assembly operation including a further preloading of the spring washer in an axial direction causing the axial faces thereof to bear under high pressure against the opposed surfaces of the side wall 40 defining the groove. Such preloading and the axial bearing coaction between the spring washer and the side walls of the annular groove 36 serve to suspend the bearing assembly 14 around the bearing carrier 6 in a manner to permit restricted relative radial movement therebetween to compensate for eccentric misalignment conditions and to further permit angular deflection or skewing of the bearing assembly relative to the axis of the bearing carrier to compensate for angular misalignment conditions. In this connection, it will be appreciated from the structural features of the spring washer 32 as shown in FIG. 4, that a limited axial reflection of the spring washer is provided in planes angularly tilted with respect to a plane perpendicular to the axis of the bearing carrier thereby providing for adjustment of an angular misalignment condition between the bearing carrier axis and the axis of rotation of the clutch mechanism.

In accordance with the foregoing resilient suspension system, restricted radial movement of the bearing assembly 14 relative to the bearing carrier 6 is permitted from a neutral or concentric position as shown in solid lines in FIG. 1 to a radially and angularly adjusted position as shown in phantom providing for an automatic adjustment of eccentric and angular misalignment conditions. The axial biasing force applied by the spring washer 32 retains the bearing assembly and carrier in the radially offset position between operating cycles of the clutch such that the adjusted aligned condition is maintained so long as it prevails. The radial shifting force to effect the automatic adjustment is provided by the forces applied to the rotatable race member 16 as a result of the coaction of the clutch release fingers 12 against the engaging face 20 thereof. The resiliency of the spring washer provides for quick adjustment of any angular misalignment condition prevalent at the initiation of each clutch actuation cycle and the bearing assembly is returned to a neutral position in which its axis of rotation is parallel to that of the bearing carrier after the clutch is reengaged and the release fingers are disengaged. The radial displacement of the bearing assembly 14 relative to the bearing carrier is limited by the coaction between the periphery of the spring washer 32 and the end wall 42 of the annular groove.

Figure 3:
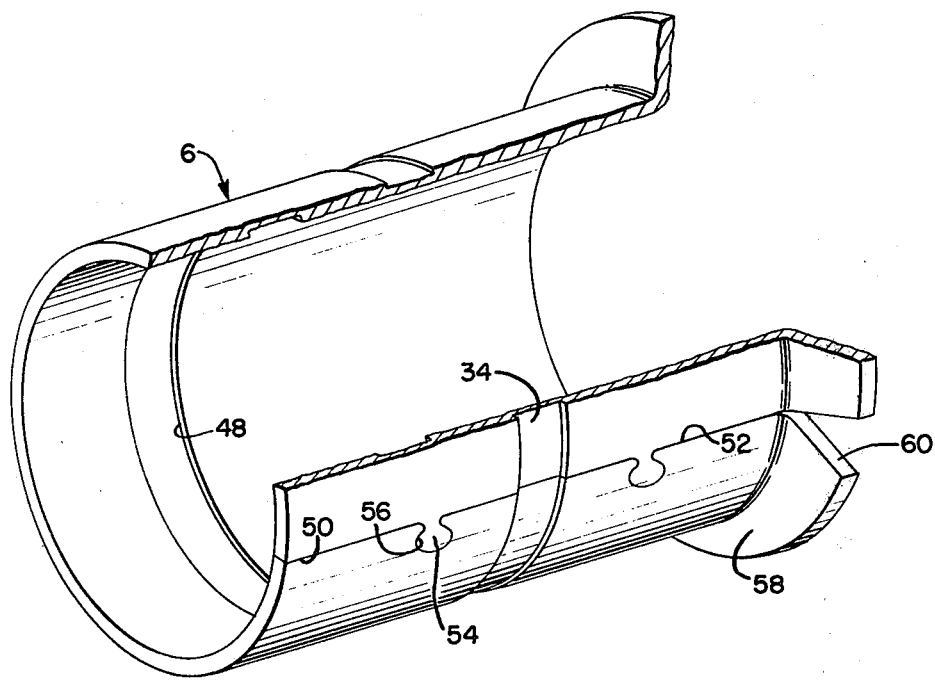
FIG. 3 is a perspective view with a portion thereof broken away of a bearing carrier component of the clutch release assembly illustrated in FIGS. 1 and 2.

Referring now in detail to FIG. 3 of the drawings, a tubular bearing carrier 6 is shown which is constructed in accordance with a preferred embodiment of the present invention. In the specific arrangement illustrated, the bearing carrier is formed as a wrapped-bushing enabling economical manufacture from a flat sheet of metal utilizing a series of punch-press operations in accordance with the techniques well known in the art. The sheet material preferably comprises steel although it is also contemplated that any formable sheet material can be employed for this purpose. It is also contemplated that the sheet material may be of a composite construction including a lining of a bearing material along its inner surface such as by employing a clad bi-metal sheet.

In accordance with normal forming techniques, sheet steel is first blanked to an appropriate size during which the groove 34 is applied to one surface of the sheet. In addition, it is also contemplated that appropriate grooves or cavities such as the groove 48 can be applied to the opposite surface of the sheet serving as reservoirs for retaining and distributing a lubricating material such as grease in the form of a film between the inner surface of the bearing carrier and the periphery of the guide member on which it is reciprocably and slidably mounted. During the blanking operation, the opposed edges 50, 52 are formed with one or a plurality of longitudinally spaced tear-shaped tabs 54 and corresponding tear-shaped apertures 56, respectively, which are rolled into interlocking relationship during the subsequent rolling operation forming thereby a so-called clinchbutt joint. While the blanked and rolled construction as shown in FIG. 3 comprises a preferred embodiment, it will be understood that the tubular bearing carrier can also be fabricated from an integral tubular stock as well as by machining from solid bar stock.

After the rolling operation, the tubular bearing carrier is subjected to a final coining operation to effect a firm interlocking and clinching of the tabs and apertures as well as an upsetting operation to form a radially projecting flange 58 at one end of the bearing carrier. During the upsetting operation, a V-shaped radially outwardly diverging notch or slot 60 is formed in the flange the sides of which are defined by the divergence of the opposed edges 50 and 52 of the original blanked sheet. The V-shaped notch provides the important function of serving as a detent or coacting means for interlocking with the clutch actuating means or fork to prevent relative rotation of the bearing carrier and the stationary race member suspended thereon relative to the guide member.

Referring again to FIG. 1, it will be noted that the actuating fork 30 includes a rearwardly extending cantilever spring member 62 which normally is provided in accordance with prior art constructions to provide a preloading of the actuating fork against the actuating face 28 of the bearing assembly preventing rattling and noise as a result of vibration. In the present instance, the provision of the V-shaped notch interlocks with the depending portion of the cantilever spring 62 thereby preventing relative rotation of the bearing carrier and the guide member. During assembly of the clutch release bearing assembly, it is not necessary to angularly position the V-shaped notch to effect an interlocking with the cantilever spring since during the first clutch actuation, the torque applied to the bearing assembly will cause rotation of the bearing carrier until the V-shaped notch is aligned with the spring 62 whereafter the clutch release bearing assembly will be retained in fixed position on the guide member. It will be further noted in the arrangement as illustrated in FIG. 1 that the axial thrust of the actuating fork 30 is transmitted directly to the bearing assembly 14 and not through the bearing carrier 6.

Figure 2:
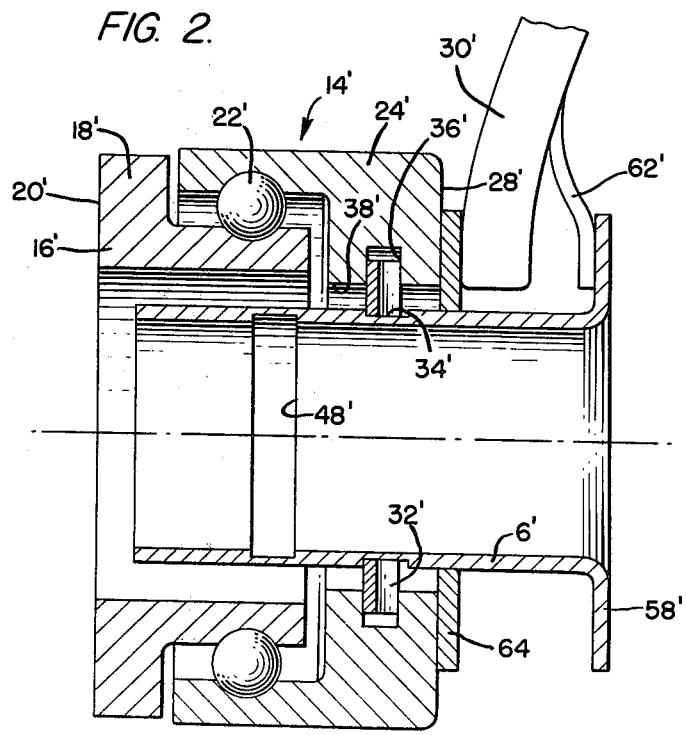
FIG. 2 is a longitudinal vertical sectional view of a clutch release bearing assembly constructed in accordance with an alternative embodiment of the present invention.

Referring now to FIG. 2 of the drawings, an alternative embodiment of the clutch release bearing assembly is illustrated in which like parts are designated by the same numeral as employed in FIG. 1 with a prime affixed thereto. As shown, the assembly includes a tubular bearing carrier 6' on which a bearing assembly 14' is suspended and which includes a rotatable race member 16' formed with an outwardly projecting radial flange 18' defining an engaging face 20' adapted to coact with the clutch release means of a rotary clutch assembly. A plurality of anti-friction elements such as balls 22' are interposed between the rotatable race member and a stationary race member 24' which is formed at its rearward end or right hand end as viewed in FIG. 2, with a radial annular face 28' disposed against a stabilization collar or washer 64. An actuating fork 30' is disposed in bearing contact against the opposite face of the stabilization collar 64 and includes a cantilever spring 62' adapted to be disposed in interlocking relationship within the V-shaped groove formed in the radial flange 58' of the bearing carrier.

As in the case of the embodiment illustrated in FIG. 1, the arrangement of FIG. 2 includes a spring washer 32' interlocked around the bearing carrier 6' by means of a groove 34' and is disposed with its peripheral portion in preloaded axial biased contact against the axial surfaces of an annular groove 36' which extends inwardly of a circular bore 38' through the stationary race member 24'. The arrangement illustrated in FIG. 2 is similar to that previously described in connection with FIG. 1 and provides for similar self-alignment adjustment with respect to eccentric misalignment conditions and angular misalignment conditions of the axis of the guide member relative to the axis of rotation of the rotary clutch and release means thereon. The principal distinction resides in the relative disposition of the rotary and stationary race members providing for a heavy duty clutch release bearing assembly providing for increased life under heavy loads at high rotational speeds. The provision of the stabilization collar 64 is optional and is preferably comprised of a blank steel washer which is disposed in the form of a press fit around the periphery of the bearing carrier 6'. The stabilization collar 64 provides for added backing support to the stationary race member 24' and further supports the clinch-butt joint of the bearing carrier in accordance with the arrangement illustrated in FIG. 3.

Figure 5:
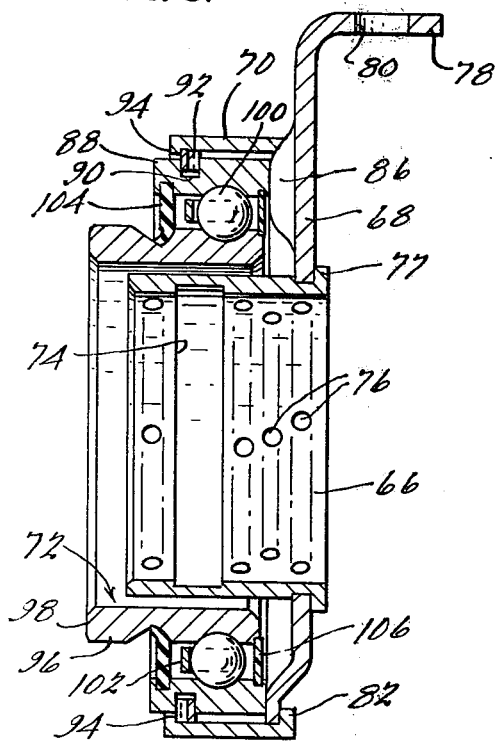
FIG. 5 is a sectional view through a clutch release bearing assembly constructed in accordance with an alternative embodiment of the present invention and taken along the line 5—5 of FIG. 6.
Figure 6:
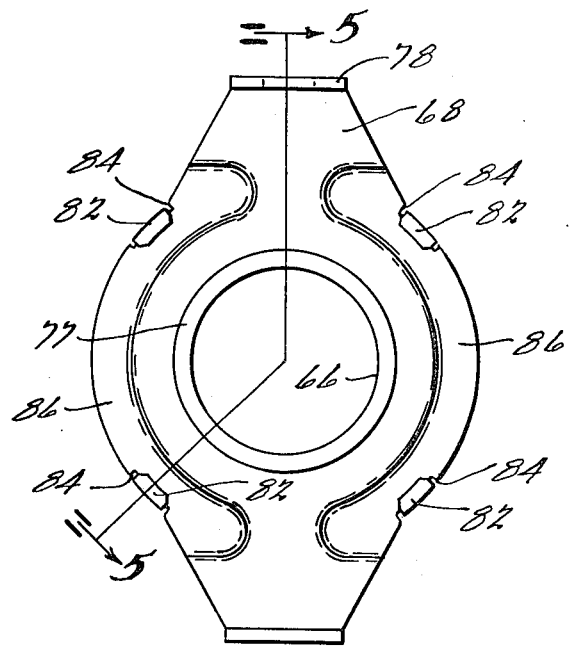
FIG. 6 is an end elevational view of the clutch release bearing assembly shown in FIG. 5.

Referring now to FIGS. 5 and 6 of the drawings, still another alternative embodiment of a clutch release bearing assembly is illustrated in which the outer race member is stationary while the inner race member is rotatable and wherein the stationary race member is supported by a wave spring engaged in the periphery thereof in contrast to the embodiment illustrated in FIG. 2 in which the wave spring is engaged in a groove in the inner surface of the stationary race member. As shown in FIGS. 5 and 6, the clutch release bearing assembly comprises a composite bearing carrier consisting of a tubular member 66, an oval-shaped flange 68 affixed to the rearward or right hand portion of the tubular member as viewed in FIG. 5 and an axially projecting annular housing 70 encircling a bearing assembly 72. The inner surface of the tubular member 66 is formed with a groove 74 and a plurality of indentations 76 for retaining a lubricant such as grease, facilitating reciprocating movement of the tubular member along a guide tube (not shown) such as the tube 8 illustrated in phantom in FIG. 1. The oval-shaped flange 68 is securely mounted on the tubular member 66 by means of a press fit within a groove on the right hand end of the tubular member as viewed in FIG. 5. The tubular member is provided with a radial annular flange 77 to further secure the assembly together. The ends of the flange 68 are bent to form a pair of rearwardly extending tabs or ears 78 provided with apertures 80 for securing the bearing carrier to an actuating fork (not shown).

The annular housing 70 extends in spaced substantially concentric relationship with respect to the periphery of the tubular member 66 and is secured to the flange 68 by means of bent tabs 82 disposed in interlocking engagement in recesses 84 formed along the edge of the flange as best seen in FIG. 6. The flange 68 is conveniently produced by a stamping operation and is formed to provide two arcuate recesses 86 which project axially forwardly of the plane of the flange and are adapted to abut the inner edge of a stationary race member 88 of the bearing assembly 72 maintaining it in appropriate axially spaced relationship. The periphery or outer surface of the stationary race member is disposed in radial clearance relationship with respect to the inner surface of the annular housing to provide for restricted radial shifting movement of the bearing assembly relative to the composite bearing carrier. For this purpose, the exterior surface of the stationary race member 88 is formed with an inwardly extending annular groove 90 in which the inner edge portion of a wave spring 92 is seatably engaged in a manner similar to that previously described in connection with FIGS. 1 and 2. The inner edge of the wave spring 92 is disposed in clearance relationship with respect to the base of the annular groove 90 to permit restricted radial shifting movement of the bearing assembly relative to the composite bearing carrier to provide for correction of an eccentric misalignment condition. Similarly, the wave spring is deflectable to also permit angular tilting of the bearing assembly to correct for an angular misalignment condition in a manner as previously described.

The outer edge of the wave spring 92 is disposed in engaging and supported relationship against the inner annular surface of the housing 70. The outer or left hand end of the housing 70 as viewed in FIG. 5 is formed with an inwardly directed flange 94 to prevent inadvertent extraction of the bearing assembly from the housing.

The bearing assembly 72 may be of any of the types previously described and includes a rotatable inner race member 96 of a length projecting axially beyond the end of the tubular member 66 forming an annular contact face 98 which is adapted to engage the clutch release fingers in a manner as previously described. The internal surface of the inner race member 96 is spaced in radial clearance relationship with respect to the periphery of the tubular member to permit radial shifting movements as well as angular tilting movements of the bearing assembly to correct for misalignment conditions.

As shown in FIG. 5, a plurality of anti-friction elements or balls 100 are interposed between the stationary and rotatable spaced relationship by means of a cage 102. An elastic annular seal 104 is secured along the forward inner edge of the stationary race member 88 and extends radially inwardly in sealing engagement with the periphery of the rotatable race member. The seal 104 serves to retain a suitable lubricant such as grease within the bearing assembly. An annular disc 106 overlies the inner or right hand end of the bearing races as viewed in FIG. 5 to restrict entry of contaminating substances into the bearing assembly.

It will be apparent from the arrangement of the bearing assembly illustrated in FIGS. 5 and 6, that radial and angular shifting movements of the bearing assembly are permitted in a manner as previously described in connection with FIGS. 1 and 2. The axial thrust load from the actuating fork connected to the ears 78 of the composite bearing carrier is transmitted through the arcuate recesses 86 of the flange directly to the inner end of the stationary race member.

As previously described in connection with the embodiment shown in FIG. 1, the inner diameter of the spring washer 32 in a free, unstressed condition is slightly smaller than the diameter of the base of the groove 34 of the bearing carrier whereby the spring washer is in a circumferentially biased condition when seated in the groove with the inner edges thereof in gripping engagement around the bearing carrier restricting relative movement therebetween. Similarly, in connection with the embodiment shown in FIGS. 5 and 6, the outer diameter of the spring washer in a free, unstressed condition is slightly larger than the internal diameter of the annular housing such that the spring washer is in a circumferentially biased condition when positioned within the housing in accordance with the arrangement shown in FIG. 5 such that the outer edges thereof are disposed in gripping engagement with the housing restricting relative rotative movement therebetween.

Figure 7:
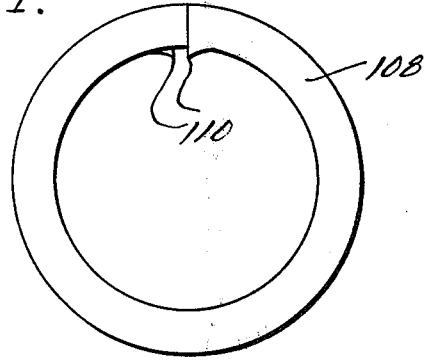
FIGS. 7 through 10 are front elevational views of spring washers formed to provide for an increased interlocking engagement with the bearing carrier.

In order to further increase the gripping engagement between the spring washer 32 and the groove 34 of the bearing carrier 6, 6' in accordance with the arrangement shown in FIGS. 1 and 2, the ends of a wave spring 108 as shown in FIG. 7 can be provided with inwardly directed barbs or burrs 110 which are adapted to bite or become embedded in the soft metal surface of the bearing carrier within the grooves 34, 34' thereby forming a mechanical interlock therebetween. The base of the groove 34, 34' can also be provided with surface roughness or irregularities in addition to the butt joint connection 45, as best seen in FIG. 3 to further increase the frictional and mechanical gripping or interlock between the wave spring and the bearing carrier preventing relative circumferential movement therebetween. When the wave spring 108 of FIG. 7 is employed in the arrangement illustrated in FIG. 5, the barbs 110 project radially outwardly from the periphery of the spring so as to become embedded and mechanically interlocked with the surface of the annular housing 70. The formation of the barbs 110 on the ends of the wave spring can be conveniently formed during the shearing of the wave spring strip into individual lengths prior to coiling.

Figure 8:
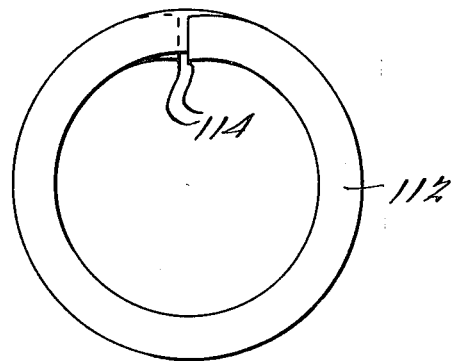
Figure 9:
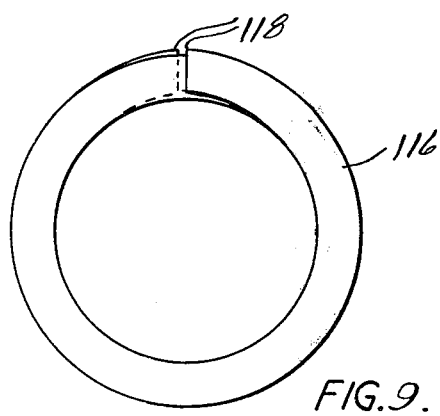

It is also contemplated that in lieu of the barbs 110 of the embodiment illustrated in FIG. 7, a wave spring 112 as shown in FIG. 8 can be formed such that the terminal portions thereof are of a reduced radius so that the sharp inwardly directed corners or edges 114 thereof tend to become embedded and mechanically interlocked in the softer base metal of the grooves 34, 34' of the bearing carrier. Alternatively, a wave spring 116 is illustrated in FIG. 9 in which the terminal portions of the spring are of an increased radius such that the sharp terminal edges 118 thereof project outwardly and are adapted to become embedded in the inner surface of the annular housing 70 of the embodiment illustrated in FIG. 5.

Figure 10:
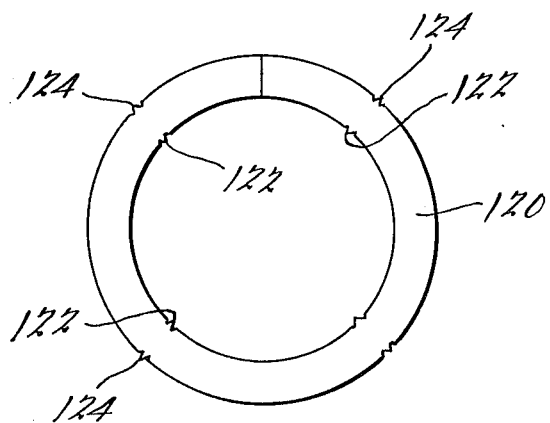

Still another alternative embodiment of a wave spring 120 is illustrated in FIG. 10 in which the inner and/or outer edges thereof are provided with staked V-shaped notches to provide a plurality of inwardly directed barbs 122 as well as outwardly directed barbs 124 disposed at circumferentially spaced intervals around the wave spring thereby further enhancing a mechanical gripping interaction with the base of the groove of the bearing carrier in accordance with the embodiments of FIGS. 1 and 2 or with the inner surface of the annular housing in accordance with the embodiment of FIG. 5, respectively.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In an automobile power train or the like including a rotatable clutch having clutch release means, a guide member disposed substantially coaxial with the axis of rotation of the clutch and clutch actuating means, the improvement comprising a clutch release assembly slidably mounted on the guide member and reciprocable therealong by the actuating means for contacting the clutch release means, said clutch release assembly comprising a tubular bearing carrier slidably mounted on the guide member, a bearing supported on said bearing carrier including a plurality of anti-friction elements interposed between a stationary race member and a rotatable race member, said rotatable race member formed with an engaging face for engaging the clutch release means, said stationary race member formed with an internal surface disposed in radial spaced clearance relationship relative to the periphery of said bearing carrier, a groove extending inwardly of said internal surface, a spring washer disposed with its peripheral portion in axially biased preloaded engagement within said groove permitting restricted radial shifting movement between said carrier and said bearing and restricted angular displacement of the axis of said bearing relative to the axis of said carrier, said spring washer having plural layers of a helically wound serpentine strip of resilient material, engaging means on said carrier for retaining said spring washer in longitudinally fixed position therealong, and coacting means on said bearing carrier for preventing rotation of said carrier relative to the guide member.

2. The improvement as defined in claim 1 in which said groove is formed by a pair of spaced substantially parallel radially extending walls terminating in a circular inner wall having a diameter greater than the outside diameter of said spring washer.

3. The improvement as defined in claim 1 in which said engaging means on said carrier comprises an external groove around the periphery thereof for interlockingly receiving the inner edge portion of said spring washer.

4. The improvement as defined in claim 1 in which said spring washer is disposed in axially biased engagement against a pair of radially extending side walls defining said groove.

5. The improvement as defined in claim 1 in which said spring washer is resiliently deflectable in an axial direction to permit restricted angular displacement of the axis of said bearing relative to the axis of said carrier to align the axis of rotation of said rotatable race member with the axis of rotation of the clutch release means.

6. The improvement as defined in claim 1 wherein said bearing carrier is comprised of a rolled tubular metal sheet having the longitudinal edges thereof disposed in abutting relationship and interlocking means along said longitudinal edges for mutually engaging and retaining said edges in abutting interlocked relationship.

7. The improvement as defined in claim 6 in which said interlocking means comprises a tab projecting circumferentially from one of said longitudinal edges and disposed in interlocked relationship within an aperture formed along the opposite of said longitudinal edges forming a clinch-butt joint.

8. The improvement as defined in claim 6 or 7 further including an integrally formed radially extending flange on one end of said bearing carrier, said flange including an outwardly extending V-shaped notch defined by the diverging radially extending said longitudinal edges.

9. The improvement as defined in claim 1 in which the internal surface of said tubular bearing carrier adapted to be disposed in sliding contact with the periphery of the guide member is formed with at least one cavity for receiving and retaining a lubricant.

10. In an automobile power train or the like including a rotatable clutch having clutch release means, a guide member disposed substantially coaxial with the axis of rotation of the clutch and clutch actuating means, the improvement comprising a clutch release assembly slidably mounted on the guide member and reciprocable therealong by the actuating means for contacting the clutch release means, said clutch release assembly comprising a tubular bearing carrier slidably mounted on the guide member, a bearing supported on said bearing carrier including a plurality of anti-friction elements interposed between a stationary race member and a rotatable race member, said rotatable race member formed with an engaging face for engaging the clutch release means, said stationary race member formed with an internal surface disposed in radial spaced clearance relationship relative to the periphery of said bearing carrier, a groove extending inwardly of said internal surface, a spring washer disposed with its peripheral portion in axially biased preloaded engagement within said groove permitting restricted radial shifting movement between said carrier and said bearing and restricted angular displacement of the axis of said bearing relative to the axis of said carrier, said spring washer comprising at least one layer of a helically wound serpentine strip of spring steel, an external groove around the periphery of said carrier for interlockingly receiving the inner edge portion of said spring washer in circumferentially and radially inwardly biased relationship for retaining said spring washer in substantially fixed position therealong, said bearing carrier further including a radially extending flange formed with a radially extending notch therein for interlockingly engaging the actuating means preventing rotation of said carrier relative to the guide member.

11. In an automobile power train or the like including a rotatable clutch having clutch release means, a guide member disposed substantially coaxial with the axis of rotation of the clutch and clutch actuating means, the improvement comprising a clutch release assembly slidably mounted on the guide member and reciprocable therealong by the actuating means for contacting the clutch release means, said clutch release assembly comprising a tubular bearing carrier slidably mounted on the guide member, a bearing supported on said bearing carrier including a plurality of anti-friction elements interposed between a stationary race member and a rotatable race member, said rotatable race member formed with an engaging face for engaging the clutch release means, said stationary race member formed with an internal surface disposed in radial spaced clearance relationship relative to the periphery of said bearing carrier, a groove extending inwardly of said internal surface, a spring washer disposed with its peripheral portion in axially biased preloaded engagement within said groove permitting restricted radial shifting movement between said carrier and said bearing and restricted angular displacement of the axis of said bearing relative to the axis of said carrier, engaging means on said carrier for retaining said spring washer in longitudinally fixed position therealong, and coacting means on said bearing carrier for preventing rotation of said carrier relative to the guide member, said coacting means comprising a radially extending flange formed with a radially extending notch therein.

12. The improvement as defined in claim 11 in which said radially extending flange is integrally formed on said carrier.

13. The improvement as defined in claim 11 wherein said radially extending flange is integrally formed with said carrier and said notch is of a generally outwardly directed V-shaped configuration for interlockingly receiving the clutch actuating means.

14. In an automobile power train or the like including a rotatable clutch having clutch release means, a guide member disposed substantially coaxial with the axis of rotation of the clutch, clutch actuating means and a self-aligning clutch release bearing assembly slidably mounted on the guide member and a reciprocable therealong by the clutch actuating means and including a bearing having a plurality of anti-friction elements interposed between a stationary race member and a rotatable race member, said stationary race member formed with an engaging face for engaging the clutch release means, the improvement comprising a tubular bearing carrier for supporting the bearing to permit restricted displacement of the bearing relative to the bearing carrier to compensate for a misalignment between the axis of the guide member and axis of rotation of the clutch, said bearing carrier including a tubular body portion formed with a radially extending flange on the end portion thereof opposite to the bearing, and coacting means on said flange for interlocking engagement with the clutch actuating means for preventing rotation of said carrier relative to the guide member, said coacting means comprising a radially extending notch.

15. The improvement as defined in claim 14 in which said flange is integrally formed with said tubular body portion.

16. The improvement as defined in claim 14 in which said bearing carrier is comprised of a rolled tubular metal sheet having the longitudinal edges thereof disposed in abutting relationship and interlocking means along said longitudinal edges for mutually engaging and retaining said edges in abutted interlocked relationship.

17. The improvement as defined in claim 16 in which said interlocking means comprises a tab projecting circumferentially from one of said longitudinal edges and disposed in interlocked relationship within an aperture formed along the opposite of said longitudinal edges forming a clinch-butt joint.

18. The improvement as defined in claims 16 or 17 in which said flange is integrally formed on one end of said tubular body portion and said notch is outwardly extending, V-shaped and defined by the diverging radially extending said longitudinal edges.

19. The improvement as defined in claim 14 in which the internal surface of said tubular body portion is formed with at least one cavity for receiving and retaining a lubricant.

20. In an automobile power train or the like including a rotatable clutch having clutch release means, a guide member disposed substantially coaxial with the axis of rotation of the clutch, clutch actuating means and a self-aligning clutch release bearing assembly slidably mounted on the guide member and reciprocable therealong by the clutch actuating means and including a bearing having a plurality of anti-friction elements interposed between a stationary race member and a rotatable race member, said stationary race member formed with an engaging face for engaging the clutch release means, the improvement comprising a tubular bearing carrier for supporting the bearing to permit restricted displacement of the bearing relative to the bearing carrier to compensate for a misalignment between the axis of the guide member and axis of rotation of the clutch, said bearing carrier including a tubular body portion formed with a radially extending flange on the end portion thereof opposite to the bearing, said flange being integrally formed with said tubular body portion, and coacting means on said flange for interlocking engagement with the clutch actuating means for preventing rotation of said carrier relative to the guide member, said coacting means comprising a generally outwardly directed V-shaped notch.

21. In an automobile power train or the like including a rotatable clutch having clutch release means, a guide member disposed substantially coaxial with the axis of rotation of the clutch and clutch actuating means, the improvement comprising a clutch release assembly slidably mounted on the guide member and reciprocable therealong by the actuating means for contacting the clutch release means, said clutch release assembly comprising a bearing carrier including a tubular member slidably mounted on the guide member, a bearing supported in radial spaced clearance relationship on said bearing carrier including a plurality of anti-friction elements interposed between a stationary race member and a rotatable race member, said rotatable race member formed with an engaging face for engaging the clutch release means, said stationary race member formed with an annular radially extending groove, an annular spring washer disposed with one edge portion thereof in supported relationship on said bearing carrier and with the other edge portion thereof in axially biased preloaded engagement within said groove permitting restricted radial shifting movement between said carrier and said bearing and restricted angular displacement of the axis of said bearing relative to the axis of said carrier, said spring washer including plural layers of a helically wound serpentine strip of resilient metal, and coacting means on said bearing carrier for preventing rotation of said carrier relative to the guide member.

22. The improvement as defined in claim 21 in which said groove is formed by a pair of spaced substantially parallel radially extending walls terminating in a circular inner wall spaced in clearance relationship from said other edge portion of said spring washer.

23. The improvement as defined in claim 21 in which said bearing carrier further comprises an annular housing extending coaxially and substantially concentric of said tubular member and overlying said bearing in radial clearance spaced relationship, said spring washer disposed with said one edge portion in supported relationship within said annular housing.

24. The improvement as defined in claim 23 in which said annular housing further includes stop means for preventing axial movement of said wave spring outwardly of the end of said housing.

25. The improvement as defind in claim 23 in which said bearing comprises an outer race member and an inner race member and wherein said outer race member comprises said stationary race member, said outer race member having a peripheral surface and said groove extending radially inwardly of said peripheral surface.

26. In an automobile power train or the like including a rotatable clutch having clutch release means, a guide member disposed substantially coaxial with the axis of rotation of the clutch and clutch actuating means, the improvement comprising a clutch release assembly slidably mounted on the guide member and reciprocable therealong by the actuating means for contacting the clutch release means, said clutch release assembly comprising a bearing carrier including a tubular member slidably mounted on the guide member, a bearing supported in radial spaced clearance relationship on said bearing carrier including a plurality of anti-friction elements interposed between a stationary race member and a rotatable race member, said rotatable race member formed with an engaging face for engaging the clutch release means, said stationary race member formed with an annular extending groove, an annular spring washer disposed with one edge position thereof in supported relationship on said bearing carrier and with the other edge portion thereof in axially biased preloaded engagement within said groove permitting restricted radial shifting movement between said carrier and said bearing and restricted angular displacement of the axis of said bearing relative to the axis of said carrier, said spring washer having engaging means on at least one edge portion thereof for interlockingly engaging said bearing carrier to restrict relative rotation therebetween, and coacting means on said bearing carrier for preventing rotation of said carrier relative to the guide member.

27. The improvement as defined in claim 26 in which said engaging means comprises at least one sharp barb resiliently biased toward imbedment into the surface of said bearing carrier.

28. The improvement as defined in claim 27 in which said barb is disposed on the end of said spring washer.

29. The improvement as defined in claim 27 in which a plurality of barbs are disposed at circumferentially spaced intervals along said one edge portion of said spring washer.

30. The improvement as defined in claim 26 in which said engaging means comprises an edge corner of an end of said spring washer along said one edge portion radially offset from the normal circular position thereof to radially bias said edge corner into interlocking engagement with said bearing carrier.

31. A clutch release bearing assembly including a tubular bearing carrier and bearing means supported on said bearing carrier, said bearing means including a stationary race member, a rotatable race member, and a plurality of anti-friction elements interposed between said race members, said bearing assembly being mounted with an internal surface disposed in radial spaced clearance relationship relative to the outer periphery of said bearing carrier and said stationary race member including an annular, radially extending groove having a pair of side walls and an end wall, the improvement comprising: an annular spring washer with one edge portion in axially biased preloaded engagement with the side walls of said groove but spaced-apart from said end wall to permit restricted radial shifting movement between said carrier and said bearing and restricted angular displacement of the axis of said bearing relative to the axis of said carrier, said spring washer including plural layers of a helically wound serpentine strip of resilient material, and engaging means on said carrier for retaining said spring washer in longitudinally fixed position therealong.

32. The assembly set forth in claim 31 wherein said spring washer includes antirotation means for preventing rotation between said spring washer and said bearing carrier.

33. The assembly set forth in claim 32 wherein said antirotation means includes at least one barb resiliently biased toward engagement with said bearing carrier.

34. The assembly set forth in claim 33 wherein said barb is disposed on one end of said spring washer.

35. The assembly set forth in clam 32 wherein said antirotation means includes a plurality of barbs disposed at circumferentially spaced intervals along the edge portion of said spring washer facing said bearing carrier.

36. The assembly set forth in claim 32 wherein said antirotation means includes an edge corner of an end of said spring washer being radially offset from the normal position to bias said edge corner into engagement with said bearing carrier.

37. The assembly set forth in claim 31 wherein said engaging means on said bearing carrier comprises an external groove around the periphery thereof for interlockingly receiving the inner edge portion of said spring washer.

38. The assembly set forth in claim 31 wherein said tubular bearing carrier includes a radially extending flange formed with a radially extending notch therein, whereby said notch defines a coacting means for interlocking engagement with a clutch actuating means in order to prevent relative rotation of said bearing carrier.

39. The assembly set forth in claim 38 wherein said radially extending flange is integrally formed on said bearing carrier.

40. The assembly set forth in claim 38 wherein said notch is a generally outwardly directed V-shaped configuration.

41. A clutch release bearing assembly including a tubular bearing carrier, bearing means supported on said bearing carrier, said bearing means including a stationary race member, a rotatable race member, and a plurality of anti-friction elements interposed between said race members, said stationary race member formed with an internal surface disposed in radial spaced clearance relationship relative to the periphery of said bearing carrier, an annular groove extending inwardly of said internal surface, and a spring washer dispsoed with its outer edge portion in axially biased preloaded engagement within said groove and its inner edge portion in supporting relationship with said bearing carrier to permit restricted radial shifting movement between said carrier and said bearing and restricted angular displacement of the axis of said bearing relative to the axis of said carrier, said spring washer comprising plural layers of a helically wound serpentine strip of spring steel.

42. In an automobile power train or the like including a rotatable clutch having clutch release assembly, a guide member disposed substantially coaxial with the axis of rotation of the clutch and clutch actuating means, the clutch release assembly being slidably mounted on the guide member and reciprocable therealong by the clutch actuating means for contacting the clutch release assembly, said clutch release assembly comprising a bearing carrier including a tubular member slidably mounted on the guide member, bearing means supported in radial spaced clearance relationship on said bearing carrier, said bearing means including a stationary race member, a rotatable race member and a plurality of anti-friction elements interposed between said stationary race member and said rotatable race member, said rotatable race member formed with an engaging face for engaging the clutch release means, the improvement comprising: said stationary race member having an annular, radially extending groove, and an annular spring washer disposed with one edge portion thereof in supported relationship on said bearing carrier and with the other edge portion thereof in axially biased preloaded engagement within said groove to permit restricted radial shifting movement between said bearing carrier and said bearing carrier and bearing and restricted angular displacement of the axis of said bearing relative to the axis of said carrier, said spring washer having plural layers of a helically wound serpentine strip of resilient material.

43. The improvement set forth in claim 42 in which said groove is formed by a pair of spaced substantially parallel radially extending walls terminating in a circular inner wall spaced in clearance relationship from said other edge portion of said spring washer.

44. The improvement set forth in claim 42 in which said spring washer includes antirotation means for preventing rotation between said spring washer and said bearing carrier.

45. The improvement set forth in claim 44 wherein said antirotation means comprises at least one barb resiliently biased toward engagement with the surface of said bearing carrier.

46. The improvement set forth in claim 45 wherein said barb is disposed on an end of said spring washer.

47. The improvement set forth in claim 44 wherein said antirotation means includes a plurality of barbs disposed at circumferentiallly spaced intervals along the edge portion facing said bearing carrier.

48. The improvement set forth in claim 44 wherein said antirotation means includes an edge corner or an end of said spring washer being radially offset from the normal position to bias said edge corner into engagement with said bearing carrier.

* * * * *

UNITED STATES PATENT AND TRADEMARK OFFICE
CERTIFICATE OF CORRECTION

PATENT NO. : 4,276,974

DATED : July 7, 1981

INVENTOR(S) : ELI M. LADIN

It is certified that error appears in the above—identified patent and that said Letters Patent is hereby corrected as shown below:

Abstract line 16, "a" should be --an--.
Column 14, line 34 following "annular" insert --radially--.
Column 14, line 35 "position" should be --portion--.
Column 16, line 1 "dispsoed" should be --disposed--.

Column 16, line 56 "circumferentiallly" should be --circumferentially--.

Column 16, line 59 "or" should be --of--.

Signed and Sealed this

Twelfth Day of January 1982

[SEAL]

Attest:

Attesting Officer

GERALD J. MOSSINGHOFF

Commissioner of Patents and Trademarks